Sept. 13, 1955  L. P. BIEFELD ET AL  2,717,841
BONDED GLASS FIBER PRODUCT AND METHOD OF MAKING SAME
Filed Jan. 9, 1951
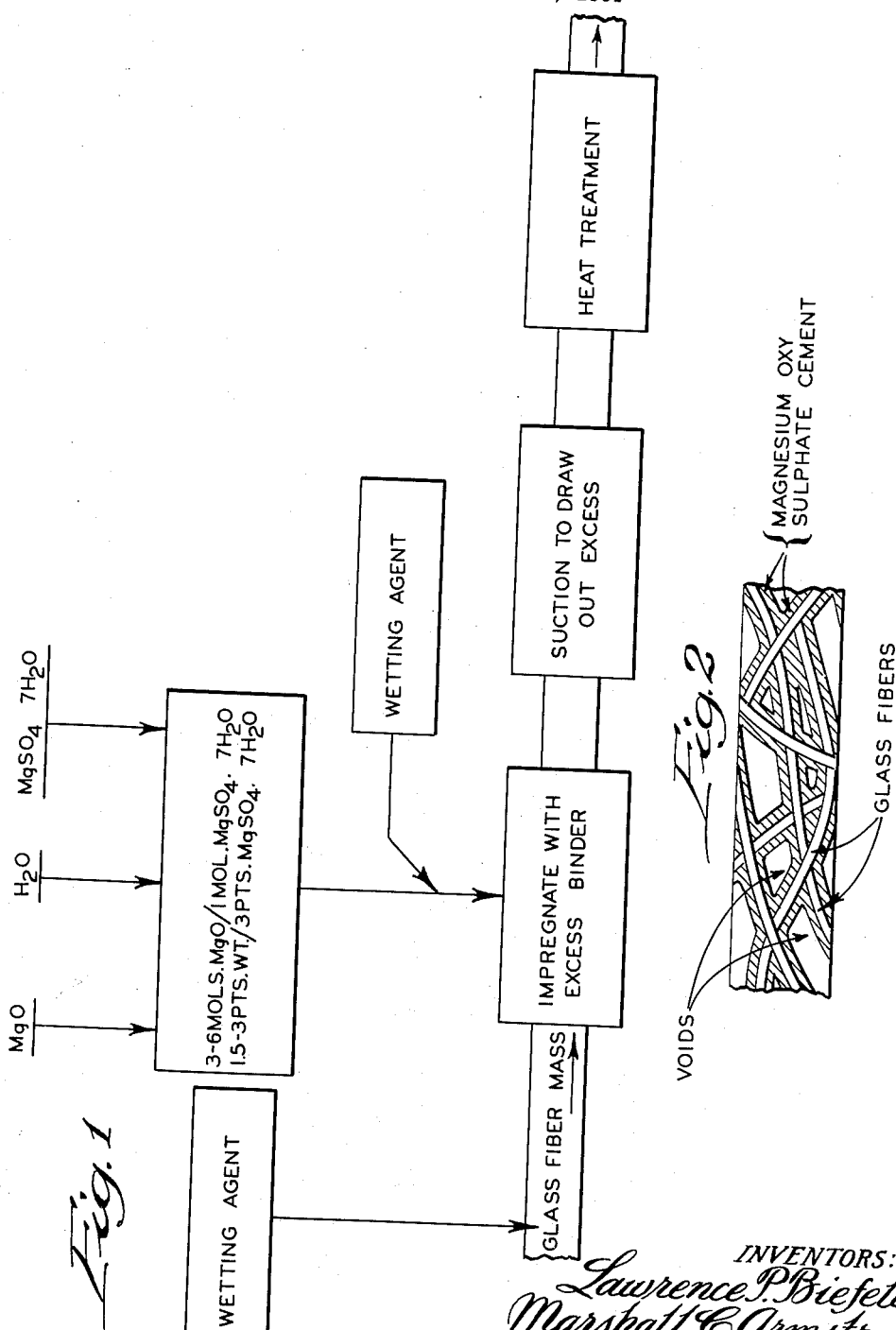
INVENTORS:
Lawrence P. Biefeld,
Marshall C. Armstrong
and Richard F. Shannon,
BY Staelin & Overman
ATTORNEYS

United States Patent Office 2,717,841
Patented Sept. 13, 1955

2,717,841

BONDED GLASS FIBER PRODUCT AND METHOD OF MAKING SAME

Lawrence P. Biefeld, Granville, Marshall C. Armstrong, Hebron, and Richard F. Shannon, Lancaster, Ohio, assignors to Owens-Corning Fiberglas Corporation, Toledo, Ohio, a corporation of Delaware Application January 9, 1951, Serial No. 205,132

14 Claims. (Cl. 117—102)

This invention relates to the manufacture of panels and boards based upon glass fibers bonded with an inorganic cement and which is characterized by hardness, strength and by porosity throughout to enable use of the board as insulation, lath, roof decking, heat barriers, structural board and the like.

Organic resinous binders have, in the past, been used in the manufacture of glass fiber reinforced structural and insulation board but such usage of organic binders does not enable greatest benefits to be derived from the incorporation of glass fibers. This is because (1) the temperature limitation of the organic binder is imposed upon the heat resistant glass fibers and such limitations are controlling in the glass fiber reinforced product, (2) the organic binder is subject to combustion whereas one of the most desirable properties that flow from glass fibers is their inertness and non-inflammability, (3) organic resinous binder must be used in substantial quantity in order to provide a hardness and density of the type desired in structural boards and the relatively high cost of the binder prohibits economical manufacture of such end products, (4) it is difficult to maintain strong adherence between the organic binder and the glass fiber surfaces, especially under high humidity conditions, so that maximum benefit cannot readily be derived from such combinations of materials.

The need in the structural field and in the field of insulation is to have a substantially completely inorganic board which is hard, dense and of high strength and yet has sufficient porosity for purposes of insulation and to enable breathing. The fiber base for a board of the type described is preferably selected of glass fibers because of their high strength and resistance to heat, flame, moisture, rot, fungus attack and the like, but the problem which prevails in their use is the manufacture of such a fiber glass board with an inorganic binder to embody such characteristics.

A large number of inorganic cements, such as gypsum, Portland cement, magnesium oxysulphate and the like, have been tried. It is preferred to adapt magnesium oxychloride or magnesium oxysulphate for such usage because (1) slurries can be formed thereof which have a relatively high cement content, (2) the cured cement is relatively light weight but strong, (3) it has low modulus of elasticity, (4) the cement in the cured or uncured stage does not attack or otherwise affect the properties of the glass fibers or the surfaces thereof such as to alter their properties, (5) it has high water of crystallization which relieves the critical problem often presented in the elimination of aqueous diluent in an applied binder composition, (6) the cement is relatively stable to high temperatures even upon long and continuous exposure, and (7) the cement system is amenable to cure with heat and the raw materials of which it is formed are readily available.

Some of the difficulties which have been encountered in the use of magnesium oxysulphate and the like as a cement binder for glass fiber products has centered about the difficulty of incorporating or applying the binder composition onto the glass fibers as they are formed to achieve uniform binder distribution and well bonded fibers. Some of the difficulty may be traceable to the lack of plastic flow of the binder during the curing cycle as compared to the high flow experienced with most organic resinous materials during an equivalent stage of the fabricating cycle. Responsibility for the inability to make most effective use of magnesium oxysulphate as a binder for glass fiber products may also be traceable to the tendency for the calcined magnesium oxide particles to filter out of the slurry onto the surface of the glass fiber body to form a dense clod or other concentrate with little, if any, entering into the interior of the body for reaction in cement formation.

It is an object of this invention to produce and to provide a method for producing glass fiber products bonded with magnesium oxysulphate and the like cement to form a structural product characterized by high strength, hardness, relatively high density, porosity and flame-proofness. It is a related object to produce and to provide a method for producing a structural item based primarily upon a glass fiber reinforcement and a magnesium oxysulphate cement, which is easy and simple to manufacture, which provides for uniform distribution of the binder throughout the end product, which enables the use of heat in effecting and accelerating cure, which can be exposed to relatively high temperatures for long periods of time without loss of strength or contour, which is flame-proof, which is porous, which permits variation of the glass fiber to cement ratio over a fairly wide range, which provides densities ranging from 15–35 pounds per cubic foot while still maintaining high porosity, and which is amenable to mass production with simple and readily available production equipment.

These and other objects and advantages of this invention will hereinafter appear and for purposes of illustration, but not of limitation, an embodiment of the invention is shown in the accompanying drawing in which—

Figure 1 is a flow sheet showing the steps in the practice of this invention, and Figure 2 is a sectional elevational view through a board embodying features of this invention.

It has been found that manufacture of a structural board of glass fibers bonded with a magnesium oxysulphate cement may be successfully practiced when an excess of the cement slurry is incorporated or applied to the surface of the glass fiber mass and then the excess over and above that which is desired to have remain in the final product is drawn off by suction from a side preferably opposite the side upon which the slurry is first applied. Successful practice of this technique has been found to depend greatly upon factors which include proper pretreatment of the glass fiber surfaces to encourage rapid wetting out of the slurry without channeling and proper formulation of the slurry, such as the use of calcined magnesium oxide of most favorable particle size and shape to militate against filtering out on the surface of the mass and characterized by high bulk density but low viscosity to favor flow into the glass fiber mass, and also the incorporation of proper wetting agents into the slurries to facilitate rapid and uniform flow of the slurry into and out of the interstices of the mass.

Best use in the practice of this invention is made of calcined brucite, such as calcined magnesium oxide derived from the brine at Luddington, Michigan. This is to be compared to the relatively unsuccessful use of calcined magnesium oxide derived from sea water or most natural sources. The differences in magnesium oxide, which may be controlling in the definition of the usability of one and the unusability of the other, may be traceable to the structure of the calcined magnesium oxide particles. Calcined brucite from Luddington brine exists in the form of rounded particles having substantially little variation in particle size which averages about 10–12 microns, while calcined magnesium oxide derived from sea water is composed of odd shaped particles having an average particle size of about 2–3 microns but some of the particles are very large and others very small. The bulk density of calcined brucite from Luddington brine is around 55 pounds per cubic foot while calcined magnesium oxide derived from sea water has a bulk density of 30–35 pounds per cubic foot. The latter has a much higher viscosity in equivalent amounts of water. It is possible that this greater viscosity is an important factor in the ability properly to make use of a slurry based upon such calcined magnesium oxide particles.

It is believed that a solid solution forms as the calcined magnesium oxide enters into solution in the magnesium sulphate solution. High strength properties are achieved when 1.5–3 parts calcined magnesium oxide (MgO) are combined with 3 parts by weight magnesium sulphate ($MgSO_4.7H_2O$) (3–6 mols MgO to 1 mol $MgSO_4.7H_2O$). Optimum conditions exist when the materials are present in the ratio of about 4.5 mols MgO to 1 mol $MgSO_4.7H_2O$. When magnesium sulphate is used in amounts less than 20 per cent by weight of the binder, the magnesium oxide tends to hydrate to unreactive magnesium hydroxide instead of entering into the solid solution and a very weak cement product results.

The glass fiber component is usually first formed into a mass, such as a matt or batt, for receiving excess of the cement slurry, portions of which are subsequently drawn off to leave the desired amount uniformly distributed throughout the glass fiber mass. The mass may be in the form of a bonded matt of glass fibers having 1–10 percent by weight of a heat hardenable resinous material as the bonding agent, such as phenol formaldehyde, urea formaldehyde, furfuryl alcohol resin, melamine formaldehyde, butadiene acrylonitrile copolymer resin or the like. Instead, the mass may be formed of unbonded glass wool fibers felted upon forming into a highly porous layer. It is possible also to replace the glass fibers in whole or in part with continuous fibers or strands of substantial length or cut to shorter lengths for the purpose of imparting greater strength to the board.

There are a number of surface active or wetting agents which may be used to assist penetration and wetting out of the glass fibers by the slurry. Some have been found to be better than others under certain conditions and in particular environments. For example, with glass fibers integrated into a mass with a phenol formaldehyde resin, best use is made of wetting agents selected from the group consisting of alkyl, aryl and mixed alkyl-aryl sulfonates and alkali metal salts thereof, such as sulfonated fatty esters, alkyl aryl ether sulfates, sodium alkyl sulfonate, sodium alkyl aryl sulfonate, sodium alkyl naphfonate, sodium alkyl aryl sulfonate, sodium alkyl naphthalene sulfonate, sodium lauryl sulphate, sodium monosulfonate of butyl phenyl phenol and the like, fatty acid amines and esters including sorbitan sesquioleate, trioleate of sorbitan polyoxyethylene and the like, and ethers such as alkyl aryl polyethylene glycol ether and polyglycol esters. With white wool glass fibers free of resinous binder, best use may be made of alkyl and aryl and mixed alkyl aryl sulfonates and the water soluble salts thereof, such as alcohol sulphates, sodium salts of alkyl naphthalene sulfonic acid, sodium alkyl sulfonate, sodium salt of alkylated aryl polyether sulphates and the like, fatty acid esters of higher alcohols including ethylene oxide condensate of fatty acids, trioleate of sorbitan polyoxyethylene derivative, sorbitan monostearte polyoxyethylene derivative and the like. Although the full complement of wetting or surface acting agent may be incorporated into the slurry to aid in wetting out of the slurry, it is best if the glass fiber mass is first treated with wetting agent, while some of the same or another wetting agent is also incorporated in the slurry composition.

For practical reasons, it is best to maintain the concentration of wetting agent as low as possible. For pretreatment of the glass fibers, concentrations ranging from 0.05–1.0 percent may be used while, in the slurry, the concentration may range from 0.05–2 percent by weight. In some instances it is best to use one surface active agent for prewetting the fibers and another as a part of the slurry—the former being selected to be more receptive to the glass fiber surfaces for the purpose of modifying the characteristics thereof. The introduction of wetting agent into the slurry in some instances appears to cause thickening of the slurry but such thickening has little influence upon the improvement which results in the penetrating power and the elimination of channeling and separation of particles. The following is illustrative of the practice of this invention:

Example 1

A glass fiber layer having a density of about 7 pounds per cubic foot, formed of wool fibers bonded with phenol formaldehyde resin, is prewet with a 0.5 percent solution of the sodium salt of alkyl naphthalene sulfonic acid (wetting agent). A slurry composed of 100 parts by weight calcined brucite, 150 parts by weight water, 150 parts by weight magnesium sulphate ($MgSO_4.7H_2O$) and 1.25 parts by weight sodium salt of alkyl naphthalene sulfonic acid is homogenized in a mixer and fed down a sluiceway onto the surface of the bonded glass fiber layer as it travels in one direction. The amount of slurry fed onto the surface of the layer is in excess of that desired to be retained in the board, yet under the conditions existing, the slurry rapidly disappears into the mass without separation of particles on the surface thereof. The layer is then passed over a suction chamber which withdraws slurry over and above the amount that is desired to have remain in the board. By proper regulation of suction and duration thereof, as well as by formulation of the slurry, the amount of binder that remains and the porosity, hardness and density of the board can be easily controlled.

In the practice of this invention, boards having a density in excess of 15 pounds per cubic foot are produced ranging on up to hard, rock-like, though porous boards having a density of 30–35 pounds per cubic foot. As the ratio of fiber to cement approaches that deemed necessary to give density of 35 pounds per cubic foot, the porosity begins rapidly to fall off and therefore ratios of about 4 parts glass fibers to 24 parts cement (about 30 pound board) forms the upper limit of concentration while about 1 part by weight fibers to 1.5 parts by weight cement supplies the lower limit of concentration.

In the above illustration the board is moved at a rate of about 6 feet per minute and the slurry disappears from the surface before the board has traveled 2 inches. After suction to remove excess slurry, the board was dried for 1–2 hours at 240° F. The product had a density of 18–20 pounds per cubic foot and was hard and porous.

Example 2

A batt formed of white glass wool fibers is prewet with a 0.3 percent aqueous solution of a fatty acid ester of a higher polyalcohol wetting agent. A slurry is formed of 100 parts by weight calcined brucite, 100 parts by weight magnesium sulphate ($MgSO_4.7H_2O$), 150 parts by weight water and 2 parts by weight ethylene oxide condensate of oleic acid. Excess slurry is applied onto the upper surface of the batt and the excess is sucked off from the under side as the batt later passes over a suction chamber. Air drying is possible to produce the end product, but drying time and cure can be accelerated by exposure to elevated temperatures in the range of 200–350° F.

Example 3

A slurry formed of 150 parts by weight calcined brucite, 300 parts by weight magnesium sulphate ($MgSO_4.7H_2O$), 200 parts by weight water and 2 parts by weight sorbitan monostearate polyoxyethylene derivative is applied in excess onto the surface of a glass wool batt having a density of about 5 pounds per cubic foot. Suction is applied to draw off slurry in excess of that necessary to maintain a ratio of 1 part by weight glass fibers to 2 parts by weight dry cement. When dried, the product is hard and porous and weighs about 15 pounds per cubic foot.

It is undesirable to use more than a 2 to 1 ratio of water to calcined magnesium oxide while optimum results are secured when the ratio is 1 to 1 or less within the limitation necessary to supply the combined water and water of reaction.

It will be apparent from the description that we have provided a new and improved porous board product suitable for structural boards where either insulation, heat, flame, strength and hardness or any combination of such elements are important factors. The product of this invention is based chiefly on glass fibers bonded with magnesium oxysulphate or oxychloride cements uniformly distributed throughout the mass in a manner which has heretofore not been attainable by the industry and we have provided a new and improved method for manufacturing same.

It will be understood that numerous changes may be made in composition, method of application and apparatus within the scope of the invention without departing from the spirit of the invention, especially as defined in the following claims.

We claim:

1. An article of manufacture comprising a porous, hard, board-like member consisting essentially of glass fibers bonded with an inorganic cement selected from the group consisting of magnesium oxychloride and magnesium oxysulphate and present in the ratio of 1 part by weight glass fibers to 1.5–6 parts by weight cement.

2. An article of manufacture comprising a porous, board-like member consisting essentially of glass fibers bonded with a magnesium oxysulphate cement having calcined brucite as the magnesium oxide component thereof in the ratio of 1.5–3 parts by weight magnesium oxide to 3 parts by weight magnesium sulphate and present in the ratio of 1 part by weight glass fibers to 1.5–6 parts by weight cement the porous, board-like member having a density ranging from 15–35 pounds per cubic foot.

3. An article of manufacture comprising a porous, hard, board-like member consisting essentially of glass fibers bonded with a magnesium oxysulphate cement formulated of calcined magnesium oxide in the form of round particles having a uniform size averaging about 10–12 microns and a bulk density of 55 pounds per cubic foot and magnesium sulphate ($MgSO_4.7H_2O$) in the ratio of 1.5–3 parts by weight calcined magnesium oxide to 3 parts by weight magnesium sulphate and with the cement being present in an amount ranging from 1.5–6 parts by weight cement to 1 part by weight glass fibers.

4. An article of manufacture as claimed in 2 in which the glass fibers are coated with a wetting agent and in which the cement has 0.05–2.0 percent wetting agent.

5. The method of manufacturing a porous structural board comprising the steps of applying a slurry of a cement composition selected of the group consisting of magnesium oxychloride and magnesium oxysulphate in excess of an amount that it is desired to have remain in the board onto one wall of a porous glass fiber mass, drawing off the slurry in excess of that to provide 1.5–6 parts by weight cement to one part by weight glass fiber through an opposite wall, and then setting the cement that remains distributed with the glass fibers.

6. The method of manufacturing a porous structural board comprising the steps of preparing a cement slurry of magnesium oxysulphate formed of ingredients present in the ratio of 1.5–3 parts by weight calcined magnesium oxide to 3 parts by weight magnesium sulphate and in which the calcined magnesium oxide component is selected of rounded particles having a uniform average and particle size of about 10–12 microns and a bulk density of about 55 pounds per cubic foot, applying the slurry onto one wall of a glass fiber mass in excess of the amount that is desired to have remain in the final product, drawing off the excess from the opposite wall, and then drying the product to set the cement.

7. The method of manufacturing a glass fiber reinforced, porous structural board comprising the steps of preparing an aqueous slurry of 1.5–3 parts by weight calcined brucite having a narrow particle size distribution range averaging about 10–12 microns to 3 parts by weight magnesium sulphate ($MgSO_4.7H_2O$) and a wetting agent selected from the group consisting of alkyl, aryl and mixed alkyl aryl sulfonates, and alkali metal salts thereof, fatty acid amines, fatty acid esters, polyglycol ethers, polyglycol esters, fatty acid esters of higher alcohols and ethylene oxide condensates of fatty acids, applying the slurry onto a fibrous glass layer in excess of the amount of cement that it is desired to have remain in the final product, which ranges from 1 part by weight glass fibers to 1.5–6 parts by weight cement, drawing off the excess slurry from the under side of the mass, and heating the board to drive off the diluent and set the cement.

8. The method of manufacturing a glass fiber reinforced porous structural board comprising the steps of preparing a slurry of calcined brucite and magnesium sulphate ($MgSO_4.7H_2O$) and a wetting agent in amounts ranging from 1.5–3 parts by weight calcined brucite to 3 parts by weight magnesium sulphate and 0.05–2 percent wetting agent, applying the slurry onto a fibrous glass layer in excess of the amount of the cement that it is desired to have remain in the product which ranges from 1 part by weight glass fibers to 1.5–6 parts by weight cement, drawing off the excess slurry from the under side of the glass fiber mass and drying the product to set the cement.

9. The method of manufacturing a glass fiber reinforced porous structural board comprising the steps of preparing an aqueous slurry of calcined brucite and magnesium sulphate ($MgSO_4.7H_2O$) in amounts ranging from 1.5–3 parts by weight calcined brucite to 3 parts by weight magnesium sulphate and 0.05–2 percent wetting agent, prewetting a glass fiber mass with a wetting agent, applying the slurry onto one surface of the prewet glass fiber mass in excess of the amount of the cement that it is desired to have remain in the final product, sucking off the cement in excess of the amount to provide 1.5–6 parts by weight cement to one part by weight glass fibers from the opposite side of the mass, and drying the product to set the cement.

10. The method as claimed in claim 8 in which the glass fiber layer onto which the slurry is applied is bonded with a phenol formaldehyde resin and the wetting agent is a compound selected from the group consisting of alkyl sulfonates, aryl sulfonates, alkyl aryl sulfonates and water soluble salts thereof.

11. An article of manufacture comprising a porous, board-like member consisting essentially of glass fibers bonded with a magnesium oxysulphate cement formed of calcined brucite having a narrow particle size distribution range averaging about 10–12 microns and present in the ratio of 1.5–3 parts by weight calcined brucite to 1–3 parts by weight magnesium sulphate, and present in the ratio of 1 part by weight glass fibers to 1.5–6 parts by weight cement.

12. An article of manufacture comprising a porous, board-like member consisting essentially of glass fibers bonded with a magnesium oxysulphate cement containing a wetting agent selected from the group consisting of alkyl, aryl, and mixed alkyl aryl sulfonates, and alkali metal salts thereof, fatty acid amines, fatty acid esters, polyglycol ethers, polyglycol esters, fatty acid esters of higher alcohols and ethylene oxide condensates of fatty acids, the magnesium oxysulphate cement being formed of calcined magnesium oxide in the form of rounded particles having a narrow particle size distribution range averaging about 10–12 microns and present in the ratio of 1.5–3 parts by weight calcined magnesium oxide to 3 parts by weight magnesium sulphate, the cement being present in the ratio of 1.5–6 parts by weight cement to one part by weight glass fibers.

13. An article of manufacture comprising a porous, board-like member consisting essentially of glass fibers bonded with a magnesium oxysulphate cement containing a wetting agent selected from the group consisting of alkyl, aryl, and mixed alkyl aryl sulfonates, and alkali metal salts thereof, fatty acid amines, fatty acid esters, polyglycol ethers, polyglycol esters, fatty acid esters of higher alcohols and ethylene oxide condensates of fatty acids, the magnesium oxysulphate particles having a bulk density of about 55 pounds per cubic foot and present in the ratio to 1.5–3 parts by weight calcined magnesium oxide to 3 parts by weight magnesium sulphate, the cement being present in the ratio of 1.5–6 parts by weight cement to one part by weight glass fibers.

14. The method as claimed in claim 8 in which the wetting agent is a compound selected from the group consisting of alkyl, aryl, and mixed alkyl aryl sulfonates and their water soluble salts, fatty acid esters of higher alcohols, and ethylene oxide condensates of fatty acids.

References Cited in the file of this patent

UNITED STATES PATENTS

| | | |
|---|---|---|
| 2,208,232 | Smolak | July 16, 1940 |
| 2,444,347 | Greger | June 29, 1948 |
| 2,500,665 | Courtright | Mar. 14, 1950 |
| 2,546,971 | Byrns | Apr. 3, 1951 |
| 2,598,980 | Denning | June 3, 1952 |
| 2,610,957 | Steinman et al. | Sept. 16, 1952 |

OTHER REFERENCES

The Condensed Chemical Dictionary, 3rd ed. Reinhold Pub. Co. 1942, pp. 173–174.

Plastic Magnesia Cements, The Dow Chemical Co. 1927, pgs. 66 and 67.